United States Patent [19]

Keys

[11] Patent Number: 5,027,569
[45] Date of Patent: Jul. 2, 1991

[54] ENCAPSULATED STATIC SEAL
[75] Inventor: James F. Keys, West Bloomfield, Mich.
[73] Assignee: The Standard Products Company, Cleveland, Ohio
[21] Appl. No.: 569,953
[22] Filed: Aug. 20, 1990
[51] Int. Cl.$^5$ .......................... E06B 3/00; B60J 10/00
[52] U.S. Cl. ...................................... 52/208; 52/397; 52/404; 52/788; 52/790; 296/96.21; 296/201
[58] Field of Search ............... 52/208, 479, 788, 790, 52/404, 397; 156/108; 296/84.1, 93, 201, 96.21

[56] References Cited

U.S. PATENT DOCUMENTS

| | | | |
|---|---|---|---|
| 1,594,765 | 3/1926 | Axe | 52/397 |
| 1,706,597 | 3/1929 | Anderson | 296/93 |
| 2,547,799 | 4/1951 | Wernig | 296/96.21 |
| 3,081,849 | 3/1963 | Hubbard | 52/397 X |

FOREIGN PATENT DOCUMENTS 240424 10/1988 Japan ....................................... 296/93

*Primary Examiner*—Richard E. Chilcot, Jr.
*Assistant Examiner*—Deborah McGann Ripley
*Attorney, Agent, or Firm*—Harness, Dickey & Pierce

[57] ABSTRACT

A static seal strip has a base and a bulb. The base is adapted to be secured to the object to be sealed. The bulb includes an encapsulated sealant and is adapted to release the sealant upon exertion of a force onto the bulb to enable the sealant to seal the object.

10 Claims, 2 Drawing Sheets

ENCAPSULATED STATIC SEAL

BACKGROUND AND SUMMARY OF THE INVENTION

The present invention relates to static seal strips and, more particularly, to a seal strip having an encapsulated sealant which, upon exertion of force, is enabled to escape from within the strip to seal an object.

Stationary windows, particularly vehicle stationary side windows, windshields and backlights, require a peripheral seal to prevent leakage. Generally, sealants such as caulking, putty or the like are utilized and formed into beads and positioned about the periphery of the window receiving opening or window itself followed by the insertion of the window into the opening. In the automotive industry, generally when a windshield or backlight is placed into its opening a reveal molding is positioned over the caulking or putty to cover the caulking or putty to provide an aesthetic appearance. The caulking or putty process is time consuming and may be very messy. The caulking or putty may be unequally distributed about the opening periphery providing a weak seal or no seal in different areas about the window. Also, if an excessive amount of caulking or putty is utilized to seal the stationary window, clean-up time is increased due to the caulking or putty squeezing out the periphery of the window.

Accordingly, designers are striving to improve the art and to overcome shortcomings existing in the field. It is desirable to have a seal which is inexpensive, can be easily applied to the stationary window or its opening, and which will provide a satisfactory seal.

Accordingly, it is an object of the present invention to provide a new and improved static seal strip. The static seal strip of the present invention provides the art with a seal strip which may be easily positioned onto a stationary window or its opening to provide a seal. The present invention, upon exertion of force, breaks away the exterior covering of the strip to expose a sealant which provides the stationary window with a mechanism to seal the window within its opening. The present invention also provides the art with a seal which applies a substantially equal amount of sealant about the periphery of the window.

From the following description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
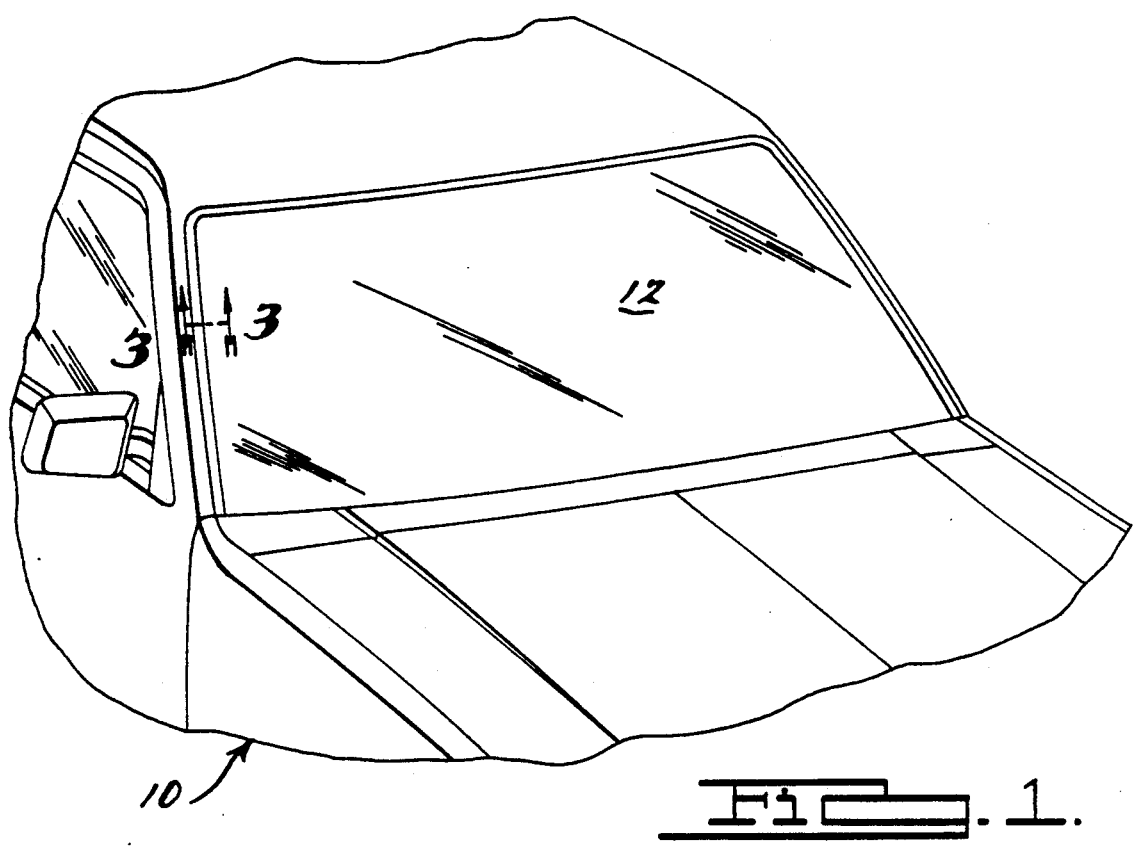
FIG. 1 is a perspective view of a vehicle windshield including a seal strip in accordance with the present invention.

Turning to the figures, particularly FIG. 1, a vehicle is illustrated and designated with the reference numeral 10. The vehicle includes a windshield 12 which includes a seal strip 20, in accordance with the present invention, sealing the windshield in its opening.

Figure 2:
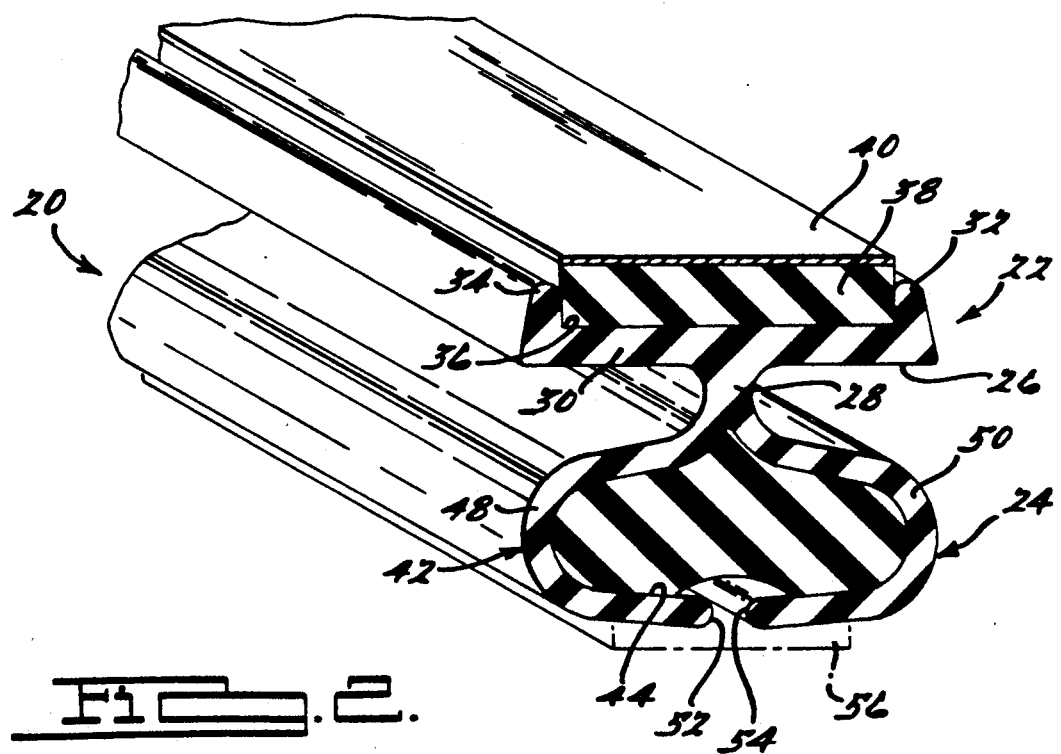
FIG. 2 is a perspective view of a portion of a seal strip in accordance with the present invention.
Figure 3:
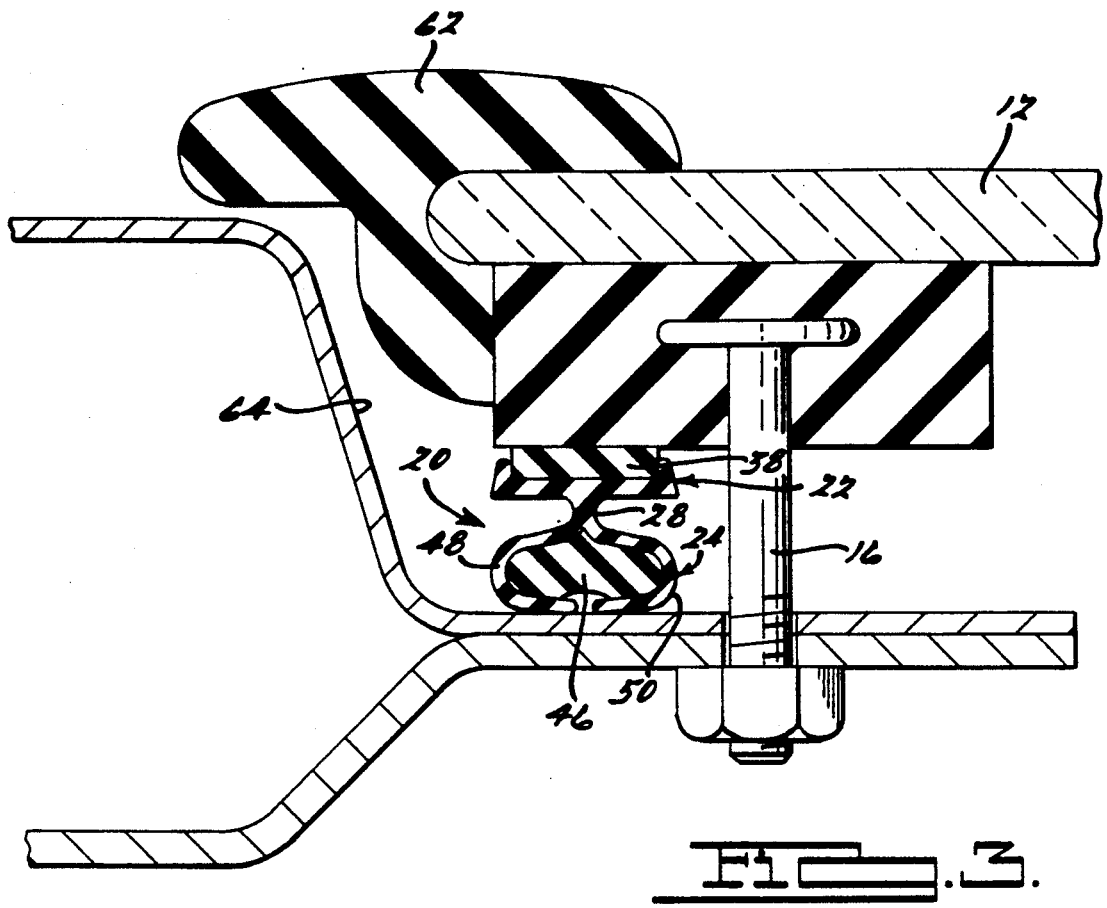
FIG. 3 is a cross-section view of FIG. 1 through a plane defined by Line 3—3 thereof illustrating the seal strip prior to tightening of the windshield fasteners.
Figure 4:
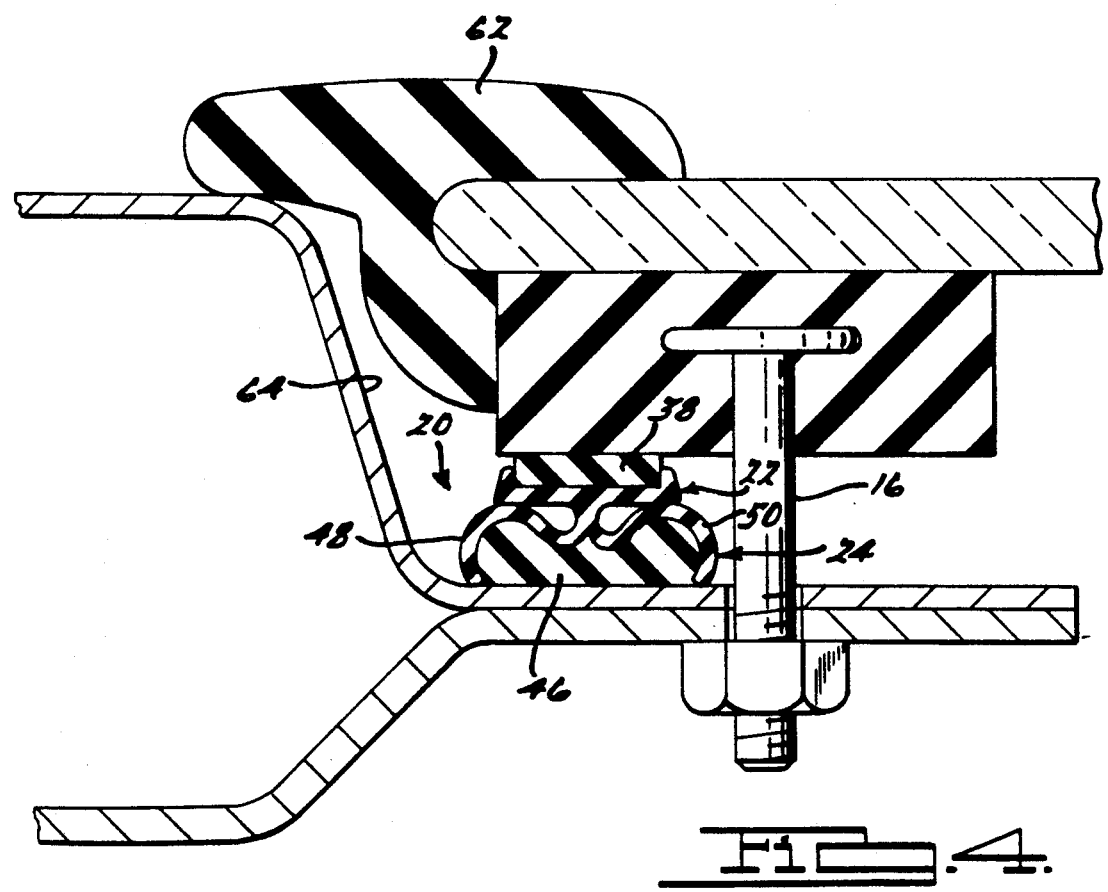
FIG. 4 is a cross-section view like that of FIG. 3 illustrating the seal strip after tightening of the windshield fasteners.

Turning to FIGS. 2-4, the seal strip 20 of the present invention is better illustrated. The seal strip 20 is extruded into its elongated strip form. The seal strip 20 may be sized or cut and be positioned to fit about the periphery of the windshield 12 or the like in a closed configuration. The seal strip 20 generally includes a base 22 and bulb 24 running the length of the seal strip 20.

The base 22 generally includes a planar surface 26 having a projecting member 28 connecting the base 22 to the bulb 24. The base 22, in cross-section, has an overall U-shape with an elongated web 30 and short extending legs 32 and 34. The elongated web 30 includes planar surface 26 on one of its major sides and an additional planar surface 36 on its other major side between legs 32 and 34. Planar surface 36 includes an adhesive member 38 adhesively secured thereto. The adhesive member 38 generally is a heat-bonded adhesive foam tape. A release layer 40 covers the adhesive tape 38 to enable shipping or the like prior to the use of the seal strip 20 where the release layer 40 is removed to uncover the adhesive member 38.

The bulb 24 is elongated having an outer wall 42 integral with the base 22 defining a hollow channel 44 which encapsulates a sealant 46. The bulb 24 in cross-section, is generally elliptical, as seen in FIGS. 2 and 3. The wall 42 is generally formed from a pair of members 48 and 50 which are connected at member 28 and are formed in an arcuate pattern forming the ellipse and are releasably connected at their free ends 52 and 54. The connection of the ends 52 and 54 may be by an optional liner 56 or any type of releasable mechanism which will enable the members 48 and 50 to separate from one another upon an exertion of a desired force.

The sealant 46 may be formed from a dense butyl rubber, sponge rubber or the like. The butyl rubber may include a blowing agent to produce a sponge butyl material to aid in compressibility. Also, other types of sealants may be utilized. The sealant 46 should be resilient and provide adequate sealing capabilities. The sealant 46 is compressed in the bulb 24 and upon escaping from within the bulb 24, the sealant expands filling an area substantially larger than that of the bulb 24. Also, a foam rope may be co-extruded with the bulb in place of the sealant to provide a seal and aid in compressibility.

Turning to FIG. 3, the seal strip 20 is illustrated on a windshield 12 prior to tightening of the windshield fasteners 16. The windshield 12 includes a reveal molding 62 and is positioned within its opening 64. Once the windshield 12 is positioned within its opening 64, the windshield 12 is ready to be tightened and secured within its opening 64. Prior to placing the windshield 12 into its opening 64, the seal strip 20 has its release layer 40 removed from the adhesive member 38 and the adhesive member 38 is applied onto the windshield 12 securing the seal strip 20 thereto, as seen in FIG. 3. Also, the seal strip 20 could be positioned onto the window opening 64.

The fasteners 16 on the windshield 12 are then tightened. As the fasteners 16 are tightened, a force is applied onto the bulb 24 of the seal strip 20. As the force reaches a desired limit, the members 48 and 50 break away at their ends 52 and 54 spreading apart from one another enabling the sealant 46 to escape and expand out from the inside of the bulb wall 42. As this occurs, the members 48 and 50 start to flatten out and expose the sealant 46 to the opening 64. Once the fasteners 62 are torqued to their final position, the sealant 46 is in contact with the opening 64 providing a seal about the periphery of the windshield 12, as illustrated in FIG. 4. Thus, upon exertion of force, the sealant 46 will be released and expand to seal the area between the windshield 12 and its opening 64.

While the above detailed description provides a preferred embodiment of the present invention, it will be understood that the present invention is susceptible to modification, alteration and change without deviating from the scope and fair meaning of the subjoined claims.

What is claimed is:

1. A seal comprising:
   an elongated strip adapted to be positioned about a periphery of an object and be formed into a closed configuration, said strip including a base and a bulb projecting from said base;
   adhesive means for retaining said strip to a surface of an object to be sealed, said adhesive means coupled with said base;
   said bulb including a wall defining a hollow channel with a sealant means positioned within said hollow channel, and means for enabling separation of said bulb wall upon exertion of a desired force on said wall enabling said sealant means to escape from said bulb wall sealing the object to be sealed.

2. The seal according to claim 1 wherein said means for separation further comprises said bulb wall formed of two members coupled together with a releasable liner whereas upon exertion of said force said two portions separate from said liner enabling said sealant to escape.

3. The seal according to claim 1 wherein said bulb in cross-section has an elliptical shape.

4. The seal according to claim 1 wherein said base in cross-section has a U-shape with an elongated web and short legs.

5. The seal according to claim 1 wherein said sealant means is dense butyl rubber.

6. The seal according to claim 1 wherein said sealant means is sponge rubber.

7. The seal according to claim 1 wherein said adhesive means is heat bonded foam tape.

8. The seal according to claim 1 wherein said adhesive means includes a release layer.

9. The seal according to claim 1 wherein said sealant means is butyl sponge rubber.

10. The seal according to claim 1 wherein said sealant means is a foam rope co-extruded with said elongated strip.

* * * * *